United States Patent [19]

Onoda

[11] 3,971,252
[45] July 27, 1976

[54] ELECTRONIC INTEGRATION CALORIMETER

[75] Inventor: Hajime Onoda, Tokyo, Japan

[73] Assignee: Kimmon Manufacturing Co., Ltd., Tokyo, Japan

[22] Filed: Apr. 11, 1975

[21] Appl. No.: 567,178

[52] U.S. Cl. ............................................... 73/193 R
[51] Int. Cl.² ........................................... G01K 17/16
[58] Field of Search ...... 73/193; 235/151.3, 151.34, 235/92 FL, 92 MT; 340/347 NT

[56] References Cited
UNITED STATES PATENTS

| | | |
|---|---|---|
| 3,445,643 | 5/1969 | Schmooch et al. ............ 235/151.34 |
| 3,617,713 | 11/1971 | Karlsson ............................. 73/193 |
| 3,802,261 | 4/1974 | Zimmerman et al. ............... 73/194 |
| 3,812,713 | 5/1974 | Karlsson ............................. 73/193 |
| 3,831,011 | 8/1974 | Hulme ................................ 73/194 |

Primary Examiner—Herbert Goldstein
Attorney, Agent, or Firm—Flynn & Frishauf

[57] ABSTRACT

An electronic integration calorimeter comprises a temperature difference detector for detecting a difference between the temperature of a heat medium flowing into a heat load and the temperature of the heat medium flowing out of the heat load, and a flow pulse generator for generating a flow pulse signal having the number of pulses proportional to the flow of the heat medium. The flow pulse signal of said flow pulse generator is shaped by a pulse shaping circuit into a flow pulse signal having a predetermined pulse width. A temperature difference pulse generator is adapted to generate a temperature difference pulse signal having the number of pulses proportional to the output voltage of the temperature difference detector and to be controlled by the shaped flow pulse signal so as to generate a pulse signal obtained by ANDing together the temperature pulse signal and the flow pulse signal. The ANDed pulse signal is supplied to a counter where pulses included in the pulse signal are counted.

5 Claims, 3 Drawing Figures

ELECTRONIC INTEGRATION CALORIMETER

This invention relates to an electronic integration calorimeter adapted to electronically integrate and measure a quantity of heat involved when a cooling or heating fluid is passed, for example, through an air-conditioner.

A conventional integration calorimeter is adapted to find an integrated quantity of heat by mechanically integrating, for example, a difference between the temperature of warmed water flowing into an air-conditioner and the temperature of the warmed water flowing out of the air-conditioner and a flow of the warmed water passed through the air-conditioner. Such an integration calorimeter, however, is accompanied with the disadvantage that it is expensive, complicated in structure and low in stability as well as in reliability.

It is accordingly the object of this invention to provide an electronic integration calorimeter featured by its simple construction and cheapness as well as high stability and high reliability.

SUMMARY OF THE INVENTION

According to the present invention an electronic integration calorimeter comprises a temperature difference detecting device for generating a first electrical signal having an amplitude proportional to a difference between the temperature of a heat medium flowing into a heat load and the temperature of the heat medium flowing out of the heat load, the first electrical signal being one of a voltage and current signal, and a flow pulse generator mounted in a flow passage of the heat medium and generating a flow pulse signal wherein the number of pulses of the flow pulse signal is proportional to the rate of flow of the heat medium. A voltage-current conversion circuit is coupled to the temperature difference detecting device and to the flow pulse generator to convert the first electrical signal produced from the temperature difference detecting device into a second electrical signal in response to the flow pulse signal, the second signal corresponding to the product of the temperature difference signal and the flow pulse signal, and the second electrical signal being one of a current and voltage signal when the first electrical signal is respectively one of a voltage and current signal. An A-D converter is coupled to the voltage-current conversion circuit to convert the second electrical signal into a second pulse signal wherein the number of pulses of the second pulse signal is proportional to the value of the second electrical signal, and a counter is coupled to the A-D converter for counting the pulses of the second pulse signal from the A-D converter.

BRIEF DESCRIPTION OF THE DRAWINGS

This invention can be more fully understood from the following detailed description when taken in conjunction with the accompanying drawings, in which.

DETAILED DESCRIPTION OF ILLUSTRATED EMBODIMENTS

Figure 1:
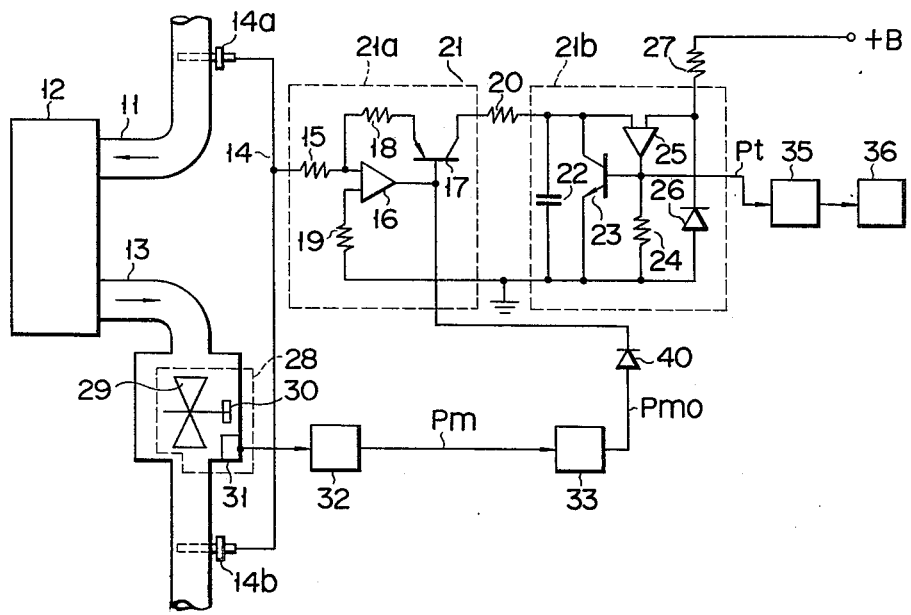
FIG. 1 is a circuit arrangement of an electronic integration calorimeter according to one embodiment of this invention.

As shown in FIG. 1 a heat medium, for example, a warm water is introduced through an input duct 11 into a heat load, for example, a heating apparatus 12 where heat is dissipated. The heat medium is discharged through an output duct 13. Thermocouples 14a and 14b are mounted on the input and output ducts 11 and 13, respectively. From a heat-electricity converter 14 consisting of the series-connected thermocouples there is obtained a thermoelectromotive force $e = k(t_1 - t_2)$ proportional to a difference between a temperature $t_1$ of the heat medium of the input duct 11 and a temperature $t_2$ of the heat medium of the output duct 13. The output terminal of the heat-electricity converter 14 is connected to a voltage-current converting and amplifying circuit 21a in a temperature difference pulse signal generator 21. That is, the output terminal of the heat-electricity converter is connected through a resistor 15 to one input terminal of an operational amplifier 16 and through a resistor 18 to the emitter of a PNP transistor 17. The other input terminal of the operational amplifier 16 is grounded through a resistor 19. The output terminal of the operational amplifier 16 is connected to the base of the transistor 17. The collector of the transistor 17 is connected through a resistor 20 to a pulse oscillating circuit 21b. A capacitor 22 of the pulse oscillating circuit 21b is connected between the resistor 20 and ground. A collector-emitter path of an NPN transistor 23 is connected in parallel with the capacitor 22 and the base of the NPN transistor 23 is grounded through a resistor 24. The collector of the NPN transistor 23 is connected to the anode terminal of a programmable unijunction transistor (PUT) 25 with the gate terminal of the transistor 25 grounded through a Zener diode 26. The cathode terminal of the PUT is connected to the base of the NPN transistor 23. +B power source is connected through a resistor 27 to a junction between the Zener diode 26 and the gate terminal of the PUT.

A flow pulse converter 28 is mounted on the output duct 13. The converter 28 comprises an impeller 29 adapted to be rotated by a stream of heat medium, a magnet 30 mounted on a rotation shaft of the impeller and a lead-in switch 31 adapted to be operated under the magnetic line of force of the magnet 30. The pulse converter 28 generates, in response to the opening and closing of the lead-in switch 31, a pulse signal having the number of pulses proportional to the flow of the heat medium i.e. the number of rotations of the impeller 29. The output terminal of the converter 28 is connected to a monostable multivibrator 33 through a pulse shaper 32 such as, for example, a Schmidt circuit. The output terminal of the multivibrator is connected through a back flow preventing diode 40 to the base of the PNP transistor 17 in the voltage-current converting and amplifying circuit 21a of the temperature difference pulse signal generator 21. The output terminal of the pulse signal generating circuit 21b is connected to an electromagnetic counter 36 through a frequency dividing circuit 35 such as, for example, a 4 BIT BIN CNTR (for example, SN 7493N).

There will now be explained the operation of an electronic type integration calorimeter having such a circuit arrangement.

Figure 2:
FIG. 2 shows a time chart obtained from the corresponding parts of FIG. 1.
Figure 2:
Figure 2:

When a thermoelectromotive force proportional to a temperature difference from the heat-electricity converter 14 is generated, the thermoelectromotive force is coupled to the operational amplifier 16. When a pulse signal having the number of pulses proportional to the flow of the heat medium is generated from the flow pulse converter 28, the pulse signal is shaped at the pulse shaper 32 into a flow pulse signal $P_m$ as shown in FIG. 2. The flow pulse signal $P_m$ is converted at the monostable multivibrator 33 into a flow pulse signal $P_{mo}$ having a predetermined pulse width. The flow pulse signal $P_{mo}$ and the output signal of the operational amplifier 16 are supplied to the base of the PNP transistor 17, thereby controlling the impedance of the PNP transistor 17. Electric current proportional to the thermoelectromotive force is passed, according to the output level of the operational amplifier 16, through the collector of the transistor 17 during the time period corresponding to a predetermined pulse width of the flow pulse $P_{mo}$ (0.2 second in this embodiment). The electric current is passed through the resistor 20 into the capacitor 22 where it is charged. Where the charging potential of the capacitor 22 is lower than a reference potential from a constant voltage circuit including the Zener diode 26, the PUT 25 generates no output and a voltage appearing across the resistor 24 becomes zero. At this time, the transistor 23 is rendered nonconductive. When the charging potential of the capacitor 22 is increased to a level equal to said reference level, the PUT 25 generates an output and a voltage is developed across the resistor 24 to render the transistor 23 conductive. As a result, the charging potential of the capacitor 22 is lowered through discharge and the output of the PUT 25 becomes zero. The capacitor 22 is again charged and the above-mentioned operation is restarted. In this way, a collector current of the transistor 17 i.e. a pulse signal having the number of pulses proportional to said thermoelectromotive force is generated from the base of the transistor 23 in the pulse generating circuit 21b.

When such pulse signal is generated during the time period corresponding to a pulse width of the flow pulse signal $P_{mo}$ and the polarity of the flow pulse is inverted, the PNP transistor 17 attains a high impedance and no electric current flows through the collector of the PNP transistor 17. As a result, the pulse oscillating circuit 21b stops its oscillation. When the polarity of the flow pulse signal applied to the base of the PNP transistor 17 is inverted, the pulse oscillating circuit 21b starts its oscillation. In this way, a pulse signal $P_t$ as shown in FIG. 2 is generated from the pulse oscillating circuit 21b. Such pulse signal is regarded as one obtained by ANDing together the temperature difference pulse signal and flow pulse signal having a predetermined pulse width and includes a logical product between a value corresponding to a flow of the heat medium and a value corresponding to a temperature difference i.e. a number of pulses proportional to an integrated quantity of heat. That is, $$P_m \alpha M$$

in which M is the flow of the heat medium.

The output pulse signal $P_t$ is frequency-divided by the frequency dividing circuit 35 and then fed to the electromagnetic counter 36 where pulses present in the pulse signal are counted.

With the above-mentioned calorimeter the polarity of the output voltage of the heat-electricity converter is reversed when the air-conditioner is switched from a "heating" condition to a "cooling" condition. It is, therefore, necessary to manually or automatically switch the polarity of the output voltage.

Figure 3:
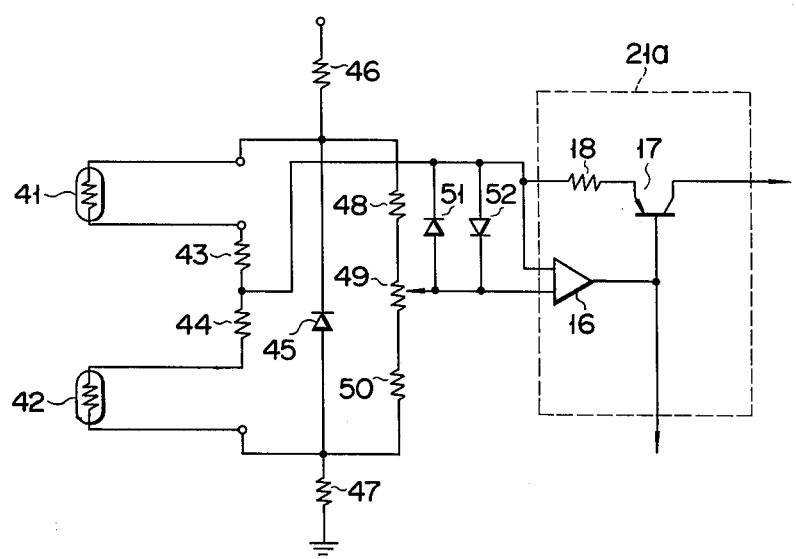
FIG. 3 shows a circuit arrangement of a temperature difference detecting circuit according to another embodiment.

In FIG. 3 is shown a circuit arrangement of a temperature difference detector utilizing thermistors 41 and 42. The thermistor 41 is mounted on the input duct 11 and the thermistor 42 is mounted on the output duct 13. The thermistors 41 and 42 are series-connected through resistors 43 and 44, respectively, and a constant voltage diode 45 is connected in parallel with the series circuit comprising the thermistors 41 and 42 and resistors 43 and 44. A series circuit consisting of a resistor 48, variable resistor 49 and resistor 50 are connected in parallel with the constant voltage diode. A junction between the resistors 43 and 44 is connected to a resistor 18 and one input terminal of an operational amplifier 16 in an operational amplifier 16. A slider of the variable resistor 49 is connected to the other input terminal of the operational amplifier 16. Between the slider of the variable resistor 49 and the junction of the resistors 43 and 44 are connected two diodes 51 and 52 which are connected in directions opposite to each other. A positive voltage +B is applied through a resistor 46 to the cathode of the constant voltage diode. The anode of the diode 45 is grounded through a resistor 47.

The above-mentioned circuit arrangement constitutes a bridge circuit. The resistive values of the thermistors 41 and 42 are varied in response to the temperature of the heat medium, thereby obtaining from the temperature difference detecting circuit output voltage proportional to the prevailing temperature difference.

If the calorimeter is so constructed, it is possible to obtain an electronic integration calorimeter featured by its small dimension and cheapness as well as high stability and high reliability. According to the electronic integration calorimeter the resistance of the flow meter section is not so great as in the case of a mechanical integration calorimeter and a flow of heat medium can be measured accurately over a wide range. Consequently, an integrated amount of heat can be measured accurately over a wide range. Since the pulse oscillating section adapted to operate the electromagnetic counter can be mounted easily at a suitable location, the concentrated or automatic inspection of the calorimeter can be easily effected.

What is claimed is:
1. An electronic integration calorimeter comprising:
a temperature difference detecting device for generating a first electrical signal having an amplitude proportional to a difference between the temperature of a heat medium flowing into a heat load and the temperature of the heat medium flowing out of the heat load, the first electrical signal being one of a voltage and current signal;
a flow pulse generator mounted in a flow passage of the heat medium and generating a flow pulse signal wherein the number of pulses per unit time of the flow pulse signal is proportional to the rate of flow of the heat medium;
a voltage-current conversion circuit coupled to the temperature difference detecting device and to the flow pulse generator to convert the first electrical signal produced from the temperature difference detecting device into a second electrical signal in response to the flow pulse signal, the second signal having an amplitude which is function of the first electrical signal and a pulse rate which is a function the flow pulse signal, and the second electrical signal being one of a current and voltage signal when the first electrical signal is respectively one of a voltage and current signal;

an A-D converter coupled to the voltage-current conversion circuit to convert the second electrical signal into a second pulse signal wherein the number of pulses of the second pulse signal is proportional to the amplitude of the second electrical signal; and a counter coupled to the A-D converter for counting the pulses of the second pulse signal from the A-D converter.

2. An electronic integration calorimeter according to claim 1 wherein said A-D converter comprises a capacitor charged by the second electrical signal of the voltage-current conversion circuit; a switching transistor having a collector-emitter path connected in parallel with the capacitor; a reference voltage circuit; and a programmable unijunction transistor coupled to receive the reference voltage of the reference voltage circuit and charging voltage of the capacitor, to generate an output signal when the levels of both the voltages applied thereto become equal to each other, and the output signal of the unijunction transistor being coupled to the switching transistor to control the switching transistor in an ON-OFF fashion.

3. An electronic integration calorimeter according to claim 1 wherein the temperature difference detecting device comprises two thermistors mounted in association with the incoming and outgoing heat mediums, respectively, and a bridge circuit including said thermistors.

4. An electronic integration calorimeter according to claim 1 wherein said voltage-current conversion circuit comprises an operational amplifier coupled to an output of the temperature difference detecting device and a transistor having a gate electrode to which is connected the outputs of the operational amplifier and of the flow pulse generator.

5. An electronic integration calorimeter according to claim 1 wherein the first electrical signal is a voltage signal and the second electrical signal is a current signal.

* * * * *